United States Patent [19]

Akin et al.

[11] 4,161,546

[45] Jul. 17, 1979

[54] PROCESS FOR TEXTURIZING PROTEINACEOUS MATERIALS

[75] Inventors: Cavit Akin, Warrenville, Ill.; Franklin D. Darrington, Munster, Ind.

[73] Assignee: Standard Oil Company (Indiana), Chicago, Ill.

[21] Appl. No.: 821,348

[22] Filed: Aug. 3, 1977

[51] Int. Cl.$^2$ .............................................. A23J 3/00
[52] U.S. Cl. .................................... 426/104; 426/242; 426/524; 426/565; 426/656; 426/657; 426/802
[58] Field of Search ............... 426/104, 564, 565, 656, 426/657, 426, 429, 430, 515, 524, 802, 242

[56] References Cited

U.S. PATENT DOCUMENTS

| 3,870,808 | 3/1975 | Boyer et al. | 426/802 X |
| 3,881,032 | 4/1975 | Matsumoto et al. | 426/524 X |
| 3,920,853 | 11/1975 | Middendorf et al. | 426/802 X |
| 3,925,903 | 12/1975 | Ward | 426/429 X |
| 3,939,284 | 2/1976 | Akin et al. | 426/656 X |
| 4,001,459 | 1/1977 | Kim et al. | 426/802 X |

*Primary Examiner*—Raymond N. Jones
*Assistant Examiner*—Esther M. Kepplinger
*Attorney, Agent, or Firm*—Gregory E. Croft; Arthur G. Gilkes; William T. McClain

[57] ABSTRACT

A process for texturizing an aqueous slurry of proteinaceous materials comprises forming an aqueous slurry of the proteinaceous material with a texturizing agent, freezing the aqueous slurry, dehydrating the frozen slurry, and heat treating the dehydrated slurry at a temperature between about 80° to about 300° C. to set the structure. The resultant sponge-like texturized product absorbs water but will not disperse in water.

9 Claims, No Drawings

PROCESS FOR TEXTURIZING PROTEINACEOUS MATERIALS

BACKGROUND OF THE INVENTION

1. Field of the Invention

This invention relates to texturization processes for proteinaceous materials.

2. Description of the Prior Art

Protein products are used in foods for their functionality as well as their nutritional value. The texture of a protein product contributes to its functionality as well as to its taste. Most vegetable protein products, e.g., soybean protein products, are in the form of powders or grits and a texturization technology has been developed to incorporate some textural characteristics to such soybean proteins. One known process produces meat substitutes from edible protein materials by forming fibers or filaments and then binding the fibers by suitable means. In this process protein fibers are prepared from a spinning dope of protein which is forced through a porous membrane such as a spinneret to form fibers. These fibers are coagulated in a bath containing suitable acids and salts and are oriented by suitable means, such as by a series of rolls revolving at increasing speeds. The fibers are placed in a salt solution, such as sodium chloride, of sufficient concentration to prevent the fibers from dissolving.

Textured protein foods can also be produced without spinning. Such a process involves rapid orientation and coagulation of protein material in a substantially undenatured, finely-divided, hydrated state under conditions which produce a shred-like structure. Orientation and coagulation of protein must be interrelated such that coagulation follows orientation of the molecules, whereby upon coagulation the oriented molecules are set in a shred-like condition. The process is conducted with about a 50% slurry of the protein material in water. The slurry is rapidly heated to and maintained at 360° F. for about 1 minute in an autoclave and cooled rapidly. A shredded meat-like texture is obtained.

In various other processes mixtures of proteins can be used where one of the proteins serves as a binder. In such mixtures gluten or egg white is generally used as a heat-coagulating ingredient to set the extruded or shredded protein textures.

In another process a chewy gel is prepared by (a) adjusting the composition of a protein-water system, in particular the pH and the solids content, to a composition conducive to gel formation, (b) shaping of the system, and (c) applying heat as necessary to produce a chewy gel. The shaping may take place before or after either of the other steps of the process. The final products produced in accordance with this process simulate the fibrous texture, chewiness and structure of meats such as pot roast, roast beef, or the like.

In another process a textured soybean meal product is produced by moistening the soybean meal, mechanically working the moistened meal in an extruder at a temperature above 212° F., pressurizing the moistened meal sufficiently to create a flowable substance, and extruding the pressurized substance through an orifice into a zone of lower pressure to produce a textured product.

SUMMARY OF THE INVENTION

In one aspect, the invention resides in a process for texturizing proteinaceous materials comprising: forming an aqueous slurry of the proteinaceous material, said slurry including a texturizing agent; freezing the aqueous slurry; dehydrating the frozen slurry; and heat treating the dehydrated slurry at a temperature of from about 80° to about 300° C. to yield a water-stable textured product. The texturizing agent is selected from the group consisting of protein isolates, protein concentrates, gelatin, or mixtures thereof. Soy isolate is a preferred texturizing agent. The proteinaceous materials can be plant protein materials such as soybean proteins, cottonseed proteins, etc., animal proteins such as fish proteins, milk proteins, meat proteins, etc., or they can be microbial protein materials such as yeasts. In this regard, preferred yeasts are *Candida utilis, Saccharomyces cerevisiae, Saccharomyces fragilis,* and *Saccharomyces carlsbergensis* because of their approval by the Food and Drug Administration. The process is applicable to all microbial cells, however.

The frozen slurry can be dehydrated in several ways including freeze drying, oven drying, microwave oven drying, and soaking the frozen slurry in an alcohol at a temperature at or below that of the frozen slurry. In the latter case, the water molecules diffuse out of the frozen structure and are replaced by the cold alcohol. It has been discovered that alcohol will not disperse the frozen structure, whereas contact with water without a prior heat treatment will cause the structure to disperse. Oven drying can be accomplished at any suitable temperature, preferably at from about 50° to about 200° C.

In addition, the dehydrated slurry must be heat treated to stabilize or cure the textured product to prevent dispersion when contacted with water. It has been found that this can be conveniently done either by simply placing the product in a dry air oven and heating, or it can be accomplished by autoclaving the product in alcohol. The primary objective here is to heat the product to cure or set the structure without causing the structure to disperse, as will happen if it is soaked in water. Autoclaving is generally carried out at temperatures of from about 120° C. to about 300° C., whereas oven treating is generally carried out at from about 80° to about 250° C. Those skilled in the art will appreciate that too high a temperature for too long a time will impart a burnt taste to the product.

Optionally, the aqueous proteinaceous slurry can be heated at a temperature of from about 30° to about 130° C., preferably to about 70° C., and whipped to form a foam prior to being frozen. This additional step creates a more porous texture than would otherwise be obtained without whipping. The heating step provides a degree of coagulation of the proteins to give the foam more body.

More specifically, the invention resides in a process for texturizing an aqueous slurry of single-cell protein materials such as yeasts comprising: adding to the slurry a texturizing agent selected from the group consisting of protein isolates, protein concentrates, gelatin, and mixtures thereof, the weight ratio of the single-cell protein materials to the texturizing agent being in the range of from about 1:9 to about 9:1; freezing the slurry; freeze drying the frozen slurry; and heat treating the dried slurry at a temperature of from about 100° to about 250° C. to produce a textured product. The heat treatment can be carried out by any suitable means such as heating in an oven or by autoclaving the dried slurry in an alcohol such as ethanol at a temperature of from about 120° to about 300° C. and drying the autoclaved product.

In another aspect, the invention resides in a process for texturizing an aqueous slurry of single-cell protein materials comprising: adding to the slurry a texturizing agent selected from the group consisting of protein isolates, protein concentrates, gelatin, or mixtures thereof; heating the aqueous slurry at a temperature of from about 30° to about 130° C.; whipping the heated slurry for from about 1 to about 30 minutes to form a foam to preserve the foam structure; dehydrating the frozen foam; and heat treating the dehydrated foam at a temperature of from about 130° to about 230° C. for from about 3 to about 120 minutes to yield a water-stable textured product. The resulting textured product can be optionally further treated, for example by extracting with ethanol to improve flavor. The frozen foam can be dehydrated by various means, including oven drying at a temperature of from about 50° to about 200° C., microwave drying, or freeze drying.

In a further aspect, the invention resides in a process for texturizing an aqueous slurry of single-cell protein materials comprising: mixing the slurry with a texturizing agent selected from the group consisting of protein isolates, protein concentrates, gelatin, and mixtures thereof, the weight ratio of the protein materials to the texturizing agent being in the range of from about 1:9 to about 9:1; freezing the mixture; soaking the frozen mixture in an alcohol having a temperature at or below that of the frozen mixture to dehydrate the frozen mixture by diffusing away the water molecules; autoclaving the frozen mixture in an alcohol at a temperature of from about 120° to about 300° C. for from about 3 minutes to about 90 minutes to make the product water stable; and drying the autoclaved mixture to yield a textured product.

DESCRIPTION OF THE PREFERRED EMBODIMENTS

The following examples will serve to illustrate various aspects of this invention, without implied limitation. Examples 1-15 illustrate one aspect of the process of this invention utilizing a heating and whipping step prior to freezing the mixture.

EXAMPLE 1

Supro-7 (A protein isolate made from soybeans by Ralston Purina Purina Co.) was suspended in water to obtain a 20 g./100 ml. water slurry. The temperature of the slurry was increased from ambient to about 70° C. gradually within about 15 minutes. During this time the slurry was whipped to a consistency of beaten egg white. The whipped product was chilled to about 15° C. and the cold product was then frozen and freeze dried. The dry product was microporous but was dispersible in water. When the dry product was heat treated at 200° C. in an oven for 12 minutes, a light brown product resulted which did not disperse in water and absorbed 22 times its weight in water. The wet product was flexible like a sponge and, when pressed, most of the water could be squeezed out without destroying the spongy texture. The wet product was chewy but was sticky. It had a fairly acceptable burnt taste.

EXAMPLE 2

A whipped product was prepared as in Example 1 except it was oven dried at 80° C. instead of freeze dried. The dry product was water dispersible unless it was heat treated at 200° C. for 8-12 minutes. The heat cured product was brown in color. It became soft in water but it did not disperse. The wet product had a bread-like porous texture which permitted water to be squeezed out of it without destroying the porous texture.

EXAMPLE 3

A whipped product was prepared as in Example 1 except the whipped product was dried in a microwave oven instead of the freeze dryer. The dry product was porous in texture. It dispersed in water unless heat cured at 200° C. for about 7-13 minutes. The heat cured product became soft and elastic when immersed in water and the water could be squeezed out of it by pressing without destroying the texture. The product was chewable and had a chewing gum-like mouthfeel.

EXAMPLE 4

Dried Torula yeast cells, grown on ethanol and extracted with ethanol, were mixed with Supro-7 (at 2 yeast/1 Supro-7 ratio) to obtain about 30 g. dry weight/100 ml. water slurry. The temperature of slurry was gradually increased from room temperature to about 85° C. within about 25 minutes in order to facilitate the dispersion of Supro-7 while the mixture was whipped to a whipped topping consistency. The whipped product was frozen at about ½ inch thickness and freeze dried. The dry product had a microporous texture but dispersed in water unless it was cured at about 200° C. for about 14 minutes. The heat cured product was light brown in color. It surprisingly did not disperse in water and remained intact. The product had a sponge-like character and absorbed about 18 times of its weight in water. The water could be squeezed out of it by pressing and could be reabsorbed when released. This operation could be repeated a multiplicity of times without destroying the textural characteristics of the product. Both the wet and the dry products were chewable and created a meat-like mouthfeel. No dispersion of single cells took place during chewing. The low moisture products had an appearance of the ham and chicken meat analogues. The textured product had a slight burnt taste.

EXAMPLE 5

A whipped product was prepared as in Example 4 except the frozen mixture was dried in a microwave oven and then heat cured at 200° C. for about 7-15 minutes. The product was light brown in color. It had a bread-like or sponge-like porous texture and absorbed water easily. The water could be partially squeezed out by pressing, and this operation did not destroy the texture of the product. The dry and wet products had a pleasant meat-like mouthfeel and were chewable.

EXAMPLE 6

Example 4 was repeated, except that instead of freeze-drying, the whipped product was oven dried at 80° C. and then heat cured in an oven at 200° C. The resulting textured product had large and small irregularly shaped pores and it absorbed water like a sponge. The wet product was elastic, chewable, and had a meat-like mouthfeel.

EXAMPLE 7

Twenty grams of ethanol-grown Torula yeast was mixed with 10 g. of gelatin in 121 ml. water at room temperature. The temperature of the mixture was increased to about 58° C. in about 7-10 minutes while simultaneously whipping the mixture using a kitchen mixer. The whipped mixture was cooled to about 15° C. The cold product had the feel of meat but became liquefied when heated.

EXAMPLE 8

The whipped product obtained in Example 7 was frozen and freeze dried. The dry product dispersed in water unless heat cured at about 180° C. for about 10 minutes. The dry product was porous in texture and became sponge-like in water. The wet product was elastic and the water could be squeezed out of it by pressing. The texture remained intact during this operation. The wet product developed a slightly meat-like flavor when prepared by soaking the textured product in boiling water.

EXAMPLE 9

A textured product was prepared according to Example 4. The particle size was reduced by grinding to about 5 mm. at the largest dimension. About 2.5 g. of these particles were wetted with about 4 ml. water and the wet textured protein was mixed with about 47.5 g. lean ground beef and ¼ teaspoonful salt. A hamburger pattie was prepared from the mixture and cooked in a microwave oven for 1 minute. About 5 ml. of juice was released during cooking. About 4.5 ml. of the juice was fat. The mouthfeel of the cooked product was similar to hamburger, but its taste was spicy. A control hamburger was prepared by using 50 g. lean ground beef and ¼ teaspoonful salt. Cooking in the microwave oven for 1 minute released about 9.4 ml. juice, about 5.4 ml. of which was fat. As the hamburgers cooled down, the control hamburger became hard in texture, but the test hamburger remained relatively tender and juicy.

EXAMPLE 10

A textured protein product was prepared according to Example 4. The dry textured product was wetted with chicken broth. A product having chicken-like texture and flavor was obtained.

EXAMPLE 11

Example 10 was repeated by using meat broth instead of chicken broth to obtain a meat-like tasting textured protein product.

EXAMPLE 12

The textured product obtained in Example 4 was extracted with about 70 percent ethanol in water. A neutral tasting textured protein product was obtained. The extraction did not harm the textural characteristics of the product.

EXAMPLE 13

The textured product obtained in Example 4 was extracted with water. The extraction removed the burnt taste, reduced the brown color, and improved the texture to closely resemble meat texture and mouthfeel.

EXAMPLE 14

A textured product was obtained according to the procedure outlined in Example 4, except the heat treatment was applied at 150° C. for 80 minutes.

EXAMPLE 15

A textured protein product was prepared according to the procedure outlined in Example 4, except the freeze dried product was heat treated at 185° C. for from 10 to 30 minutes. The product was non-dispersible in water and did not develop a brown color during the heat treatment unless heated for a longer period than 30 minutes.

Examples 16-18 illustrate one aspect of the process of this invention wherein the mixture is frozen, freeze dried, and heat treated.

EXAMPLE 16

Torula yeast (*Candida utilis*) was grown in a fermentor containing an ethanol and minerals medium. The cells were harvested by centrifugation and the resulting paste (about 20 percent dry weight) was recovered. The paste was mixed with Supro-7 to obtain a yeast paste to Supro-7 ratio of 2/1. Water was added to obtain slurries and pastes of about 10 percent to 30 percent dry weight at room temperature (about 23° C.). The aqueous mixtures were frozen over dry ice and freeze dried. The freeze dried products were white or light cream colored with a porous needle-like texture. They dispersed in water unless they were heat cured in a hot air oven at about 175°–210° C. for about 30 to 10 minutes. The low temperature-treated samples were white to light tan colored while the high temperature-treated samples were light brown in color. When soaked in water, the heat treated samples absorbed water which could be squeezed out easily by pressing the product. Repeated application of this operation did not cause destruction of the textural characteristics of the product. Both the dry and wetted products were chewable. All samples had a slight burnt taste which was heavier in higher temperature-cured samples. The burnt taste of the lower temperature-cured samples was not objectionable.

EXAMPLE 17

Supro-7, ethanol extracted dry Torula yeast, and water were mixed at the ratios indicated in Table I. The mixtures were frozen and freeze dried. The dry products were heat treated at 190° C. for 30 minutes and soaked in water. The water holding capacity of the products was determined and their textural characteristics were observed. The results are given in Table I.

TABLE I

Textural and Water Holding Characteristics of the Textured Products Prepared From Various Water Slurries

| Yeast (grams) | Supro-7 (grams) | Water (ml.) | Water Holding Index (gH$_2$O/dry product) | Texture in Water |
|---|---|---|---|---|
| 2 | 1 | 3 | 2 | Tough meatlike |
| 2 | 1 | 6 | 4 | Tough meatlike |
| 2 | 1 | 9 | 6.4 | Medium soft meatlike |
| 2 | 1 | 12 | 7 | Medium soft meatlike |
| 2 | 1 | 15 | 9 | Soft meatlike |
| 2 | 1 | 18 | 9 | Very soft meatlike |

EXAMPLE 18

Ten grams of defatted soybean flour and 5 g. Supro-7 were mixed in 30 ml. water at room temperature. The mixture was frozen and freeze dried. The dried product had a needle-like texture resembling muscle fibers. It was heat cured at 185° C. for 30 minutes to give a non-water dispersible product. This product was sponge-like and it absorbed water. The wet product had a meat-like handfeel and was chewable.

Examples 19–25 illustrate one aspect of the process of this invention wherein the heat treatment is carried out by autoclaving in alcohol.

EXAMPLE 19

Torula yeast (*Candida utilis*) was grown in a fermentor on an ethanol and minerals medium. The cells were harvested by centrifugation and the paste (about 20% dry weight) was mixed with Supro-7 at room temperature to obtain a yeast paste to Supro-7 ratio of about 2/1. Water was added to obtain slurries or pastes of 15 to 40% dry weight. The mixtures were frozen and freeze dried. The freeze dried products were dispersible in water, but retained their rigid texture when dipped in 96% ethanol. When removed from ethanol, air dried and dipped in water, they dispersed. Dispersion in water was eliminated by autoclaving the ethanol soaked products for 15 to 120 minutes under about 15 psig. pressure at about 121° C. The autoclaved product was either dried in air or in an oven at 50° C. The dry product had a texture composed of needle-like filaments. It was chewable without dispersion in the mouth. When dipped in water, it remained intact and swelled by absorption of water. The water could be squeezed out of the product and reabsorbed without significant change in textural integrity of the product.

EXAMPLE 20

The autoclaved product obtained in Example 19 was dried and further heat treated at 150° C. in a dry air oven. The product was white in color. It retained its textural characteristics in water.

EXAMPLE 21

The procedure of Example 19 was repeated, except that instead of autoclaving the freeze dried product in ethanol, it was autoclaved in isopropanol. A white product which retained its texture in water was obtained.

EXAMPLE 22

The procedure of Example 19 was repeated, except that instead of autoclaving in ethanol, the freeze dried product was autoclaved directly either in an open beaker or in a sealed vial. Both autoclaved products lost their texture when placed in water.

EXAMPLE 23

The procedure of Example 19 was repeated, except that instead of 96% ethanol, 20%, 40%, 60%, 75%, 80%, 85%, and 90% ethanol solutions in water were used during autoclaving. In all cases the final product resisted dispersion in water. When solutions with less than 60% ethanol content were used, however, the solutions had to be added gently or otherwise the textural integrity of the products was lost prior to autoclaving.

EXAMPLE 24

A slurry was prepared with 2 g. of ethanol-extracted, spray dried Torula yeast, 1 g. Supro-7, and 9 ml. distilled water. The mixture was frozen and freeze dried. The freeze dried product was dipped in 90% ethanol and autoclaved for 30 minutes at about 121° C. under about 15 psig. pressure in a sealed tube. The autoclaved product was taken out of the ethanol and dried in an oven at 80° C. The dry product was white in color and had a chicken meatlike appearance. When soaked in water, the product absorbed water but did not disperse.

EXAMPLE 25

A slurry was prepared with 2 g. of defatted soybean flour, 1 g. Supro-7, and 9 ml. distilled water. The mixture was frozen and freeze dried. The dry product was dipped in ethanol and autoclaved for 1 hour at about 121° C. and about 15 psig. The ethanol was then decanted out and the residue was dried at 50° C. in a hot air oven. The final product retained its textural integrity in water.

Examples 26–27 serve to illustrate one aspect of the process of this invention incorporating the use of cold alcohol as a replacement for freeze drying to dehydrate the frozen mixture.

EXAMPLE 26

A slurry was prepared by using 2 g. Torula yeast (ethanol extracted and oven dried), 1 g. Supro-7, and 9 ml. water. The slurry was frozen over dry ice. The frozen mass was broken into pieces measuring about $\frac{1}{4}'' \times \frac{1}{4}'' \times 1''$ and soaked in about −10° C. cold ethanol for about three hours. After three hours the mixture was heated for about 45 minutes in sealed tubes at about 121° C. under about 15 psig pressure. The heat treated pieces remained intact in the autoclave. The excess liquid was decanted off and the pieces were dried in an oven at 50° C. The dry products did not disperse in water. The wet products had a sponge-like texture and became swollen as they absorbed water. The dry and wet products were white to light gray in color and had a neutral taste.

EXAMPLE 27

The ethanol soaked product obtained in Example 26 was put in an oven at 100° C. to dry and then further heat treated at about 190° C. to render it non-water dispersible.

It will be clear to those skilled in the art that many variations can be made from these examples, shown for purposes of illustration, without departing from the scope of this invention.

We claim:

1. A process for texturizing an aqueous slurry of single-cell protein materials comprising:
    (a) adding to the aqueous slurry of single-cell protein materials a texturizing agent selected from the group consisting of protein isolates, protein concentrates, gelatin, or mixtures thereof, wherein the dry weight ratio of the single-cell protein material to the texturizing agent is in the range of from about 1:9 to about 9:1;
    (b) heating the aqueous slurry to a temperature of from about 30° to about 130° C.;
    (c) whipping the heated slurry to form a foam;
    (d) freezing the foam;
    (e) dehydrating the frozen foam; and
    (f) heat treating the dehydrated foam at a temperature of from about 130° to about 230° C. for from about 3 to about 120 minutes to yield a water-stable textured product.

2. The process of claim 1 wherein the textured product is ethanol-extracted to improve its flavor characteristics.

3. The process of claim 1 wherein the frozen foam is oven dried at a temperature of from about 50° to about 200° C.

4. The process of claim 1 wherein the frozen foam is microwave dried.

5. The process of claim 1 wherein the frozen foam is freeze dried.

6. The process of claim 1 wherein the texturizing agent is soy isolate.

7. The process of claim 1 wherein the texturizing agent is a mixture of soy isolate and gelatin.

8. The process of claim 1 wherein the single-cell material is *Candida utilis* yeast.

9. The product prepared by the process of claim 1.

* * * * *